(12) United States Patent
Webb

(10) Patent No.: US 6,441,366 B1
(45) Date of Patent: Aug. 27, 2002

(54) SEALED FIBER OPTIC GYROSCOPE ASSEMBLY

(75) Inventor: Richard Webb, Wantage (GB)

(73) Assignee: Bookham Technology PLC, Oxfordshire (GB)

( * ) Notice: Subject to any disclaimer, the term of this patent is extended or adjusted under 35 U.S.C. 154(b) by 0 days.

(21) Appl. No.: 09/533,248

(22) Filed: Mar. 22, 2000

(30) Foreign Application Priority Data

Mar. 24, 1999 (GB) .............................................. 9906812

(51) Int. Cl.⁷ ................................................. G01D 5/34
(52) U.S. Cl. ...................... 250/231.12; 356/465; 385/12
(58) Field of Search ........................ 250/231.12, 227.11, 250/227.19, 227.14, 227.17, 227.27; 356/465, 460; 385/12, 13, 115, 128

(56) References Cited

U.S. PATENT DOCUMENTS

| 5,778,543 A | | 7/1998 | Schneider et al. ............. 33/324 |
| 5,896,199 A | * | 4/1999 | Mark et al. .................. 356/350 |
| 6,201,923 B1 | * | 3/2001 | Yuhara et al. ............... 385/137 |

FOREIGN PATENT DOCUMENTS

| EP | 0 383 231 | 8/1990 |
| EP | 0 452 938 A2 | 10/1991 |
| EP | 7-128070 | 5/1995 |
| EP | 0 660 082 | 6/1995 |
| EP | 0 678 730 A1 | 10/1995 |
| EP | 0 833 128 | 4/1998 |

OTHER PUBLICATIONS

Lefevre H C et al: "Integrated optics: a practical solution for the fibre–optic gyroscope" Proceedings of the SPIE, US, SPIE, Bellingham, VA, vol. 719, Sep. 24, 1986 pp. 101–112, XP002090361.

* cited by examiner

*Primary Examiner*—Kevin Pyo
*Assistant Examiner*—Seung C. Sohn
(74) *Attorney, Agent, or Firm*—Sughrue Mion, PLLC

(57) ABSTRACT

An hermetically sealed fiber optic gyroscope assembly has loops of optic fiber on a support ring in a sealed casing comprising a base plate, a perimeter wall upstanding from the base plate and a cover secured to the perimeter of the wall, together with optical circuitry located within the casing for directing light around the optic fibre loops together with electrical connecting circuitry passing from the optical circuitry to external terminals in sealed engagement with the casing.

16 Claims, 3 Drawing Sheets

SEALED FIBER OPTIC GYROSCOPE ASSEMBLY

The invention relates to a sealed fibre optic assembly for a fibre optic gyroscope.

BACKGROUND OF THE INVENTION

Fibre optic gyroscopes for measuring rotation rates are known. Such systems use the Sagnac effect in which light traverses an optic fibre loop rotating about an axis perpendicular to its plane and the optic transit time of the light around the loop varies with the loops rotation rate. If two optical signals are sent in opposite directions around the optic fibre loop, a phase difference is generated which is proportional to the rotation rate.

The object of the present invention is to provide an improved sealed fibre optic assembly for a fibre optic gyroscope.

SUMMARY OF THE INVENTION

The invention provides a sealed fibre optic assembly for a fibre optic gyroscope which assembly comprises a fibre optic support ring carrying at least one loop of optic fibre, a sealed casing surrounding said support ring and comprising a base plate, a perimeter wall upstanding from the base plate and surrounding said support ring, a cover secured to the perimeter wall so as to close the casing on the side of the support ring remote from the base plate and electrically connecting circuitry comprising external electrical terminals and electrical connectors extending from said terminals through part of the casing in sealed engagement with the casing, to the interior of the casing, and optical circuitry coupled to said loop to direct light in opposite directions around said loop and to receive light from the loop, said optical circuitry comprising a light source, a light detector and phase detecting means, and being mounted within said sealed casing, and electrically coupled to said electrical connectors in the interior of the casing.

Preferably said optical circuitry is located on said base plate within said support ring.

Preferably said electrical connectors are formed as a unit with part of the casing remote from the cover so that electrical connection may be made between the optical circuitry and the connectors while the cover is removed.

Preferably said base plate includes a projecting region outside said perimeter wall on which external electrical terminals are provided and connected to said optical circuitry.

Preferably said base plate comprises electrically insulating material and includes buried electrical connectors extending below said perimeter wall interconnecting said optical circuitry with external electrical terminals.

Preferably said optical circuitry includes at least one phase modulator.

Preferably said optical circuitry includes polarising means for polarising light transmitted around the loop.

Preferably said optical circuitry comprises an integrated semiconductor optical device.

Preferably said optical circuitry is integrated on a single planar substrate.

Preferably said integrated semiconductor optical device includes at least one silicon waveguide.

Preferably said integrated semiconductor optical device includes a plurality of silicon rib waveguides.

Preferably said perimeter wall is cylindrical.

Preferably said cover comprises a circular plate.

Preferably said base plate comprises a circular portion on which said perimeter wall is secured in sealed contact.

Preferably the perimeter wall is metallic and the base plate has a solder ring formed over an insulating layer covering the electrical connectors, the solder ring being soldered to an edge of the perimeter wall.

Preferably the cover is metallic and is soldered to the other end of the perimeter wall.

Preferably the or each optic fibre loop is wound on a spool having a cut away portion in part of the spool adjacent the base and the base has a mating projection to engage the cut away portion and hole the spool in a required rotational position relative to the base.

Preferably the or each optic fibre loop is wound on a spool having a cut away portion of sufficient arcuate extent to allow fibres to pass from the outside of the spool through the cut away portion to the optical circuitry without unwanted stress in the fibres.

DESCRIPTION OF THE PREFERRED EXAMPLE

Figure 1:
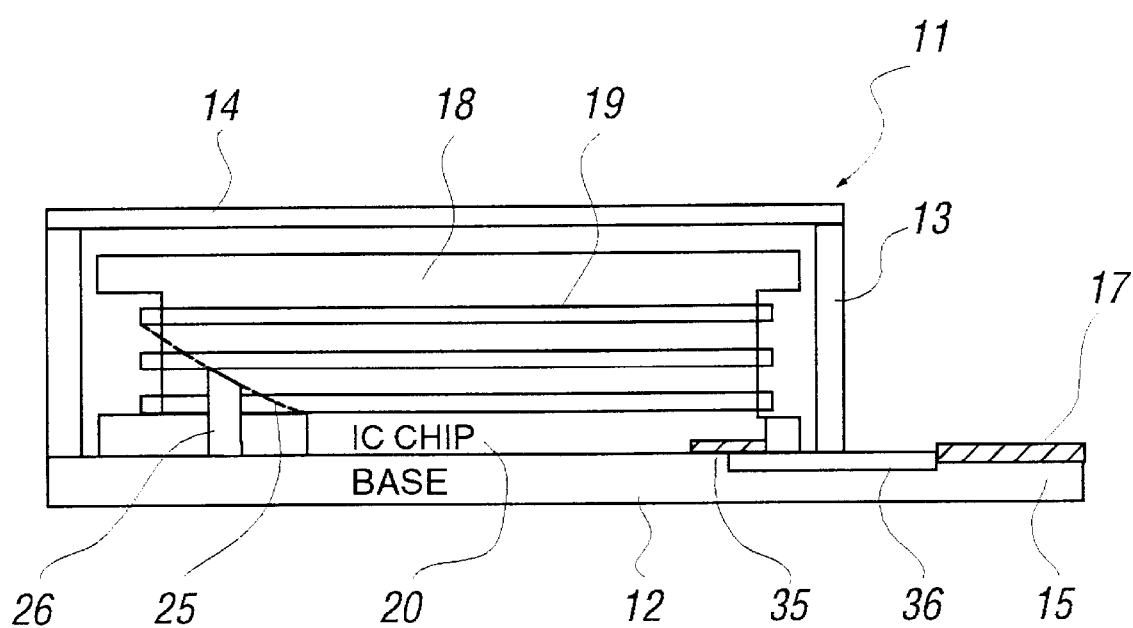
FIG. 1 is a vertical section through a sealed fibre optic assembly in accordance with the present invention.
Figure 2:
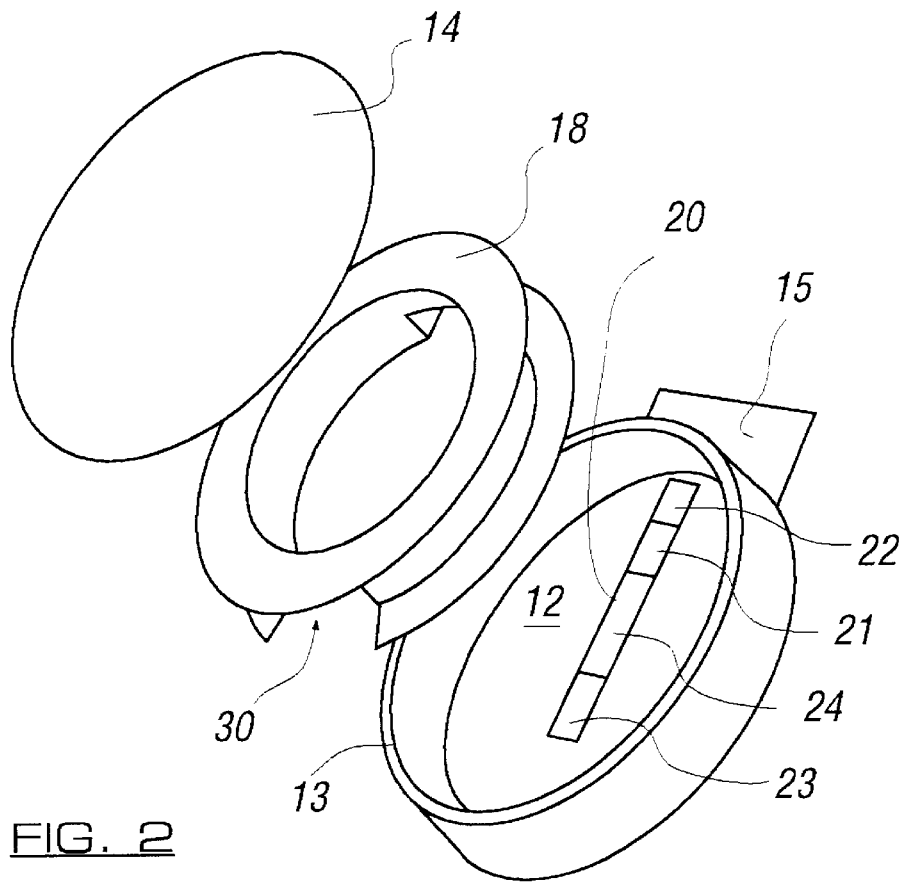
FIG. 2 is an exploded view of the assembly of FIG. 1.
Figure 3:
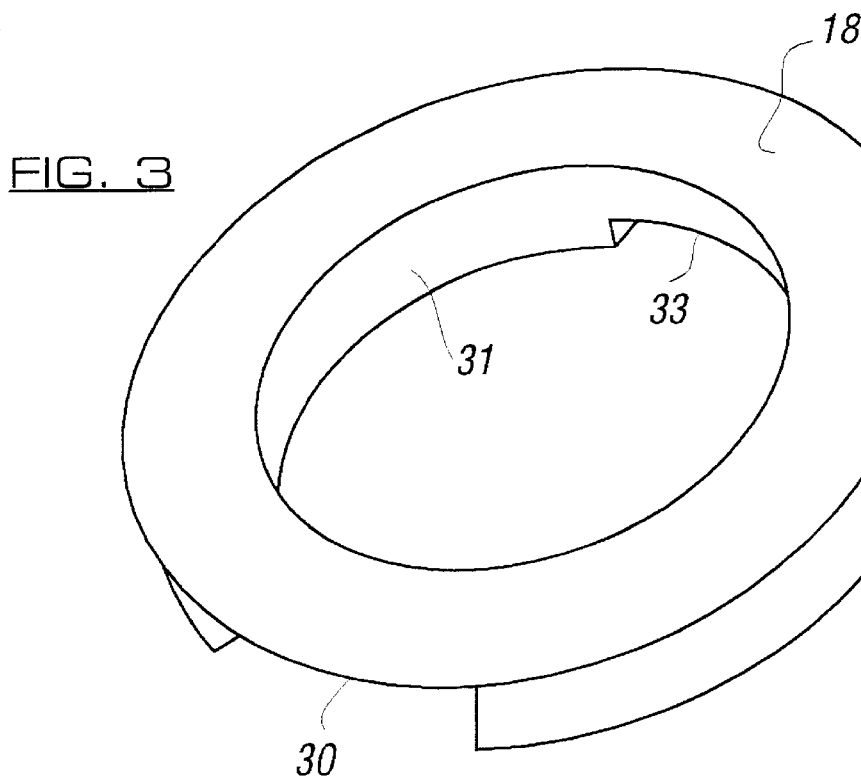
FIG. 3 is a perspective view on an enlarged scale of part of the assembly of FIG. 1.
Figure 4:
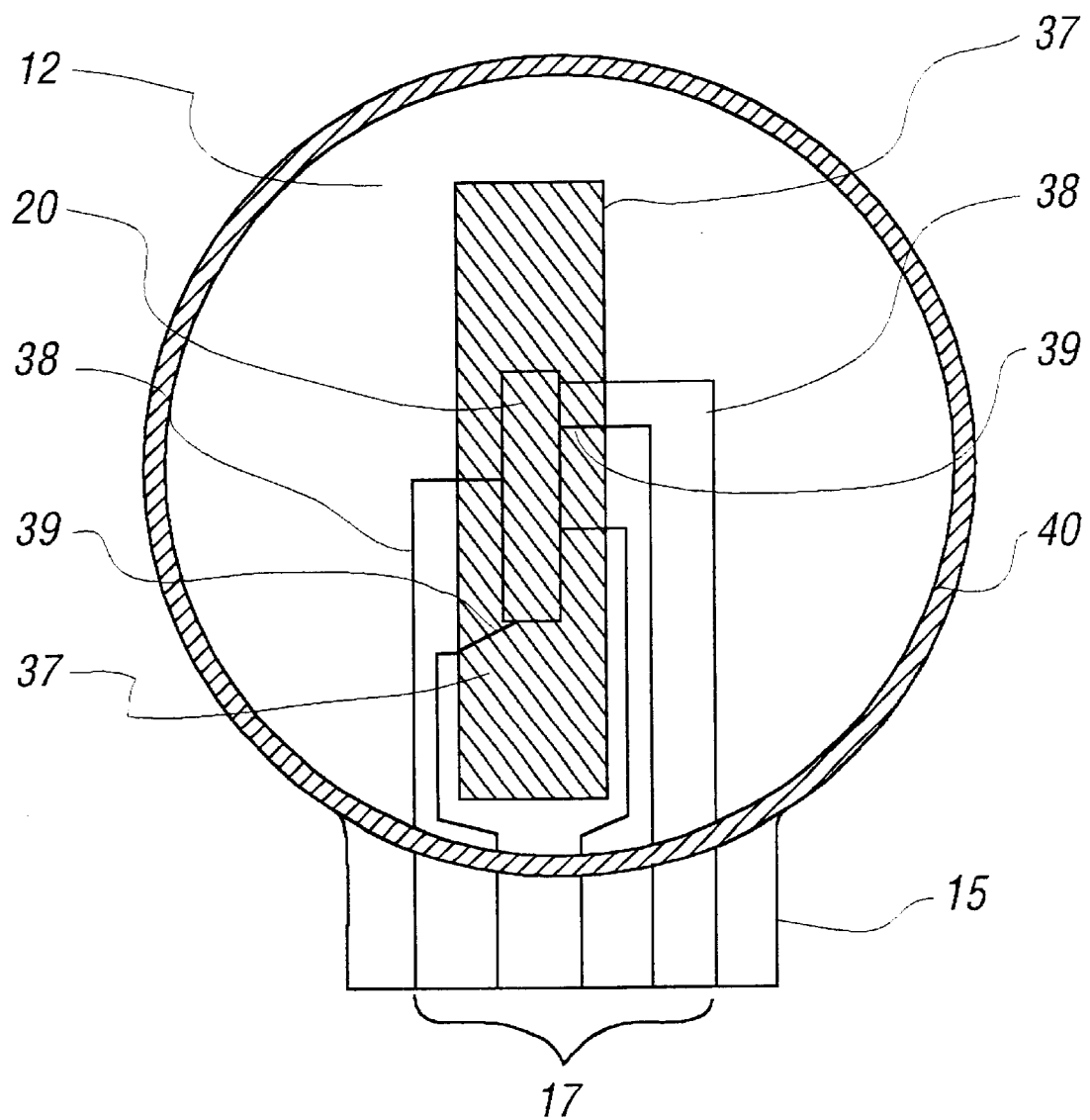
FIG. 4 is a plan view of the base plate and electrical connectors.

The assembly of this example comprises a hermetically sealed casing in the form of a cylindrical container 11 having a ceramic base plate 12 on which is sealably secured an upstanding cylindrical wall 13 covered by a circular lid 14. The base 12 is a ceramic base having a main region of circular cross section corresponding to the shape of the cylindrical wall 13 but it has a rectangular projection 15 which extends outside the wall 13 and provides external electrical terminals 17. Within the container 11 there is a fibre carrier 18 in the form of an electrically insulating cylindrical spool on which are wound several turns of optical fibre 19. The spool 18 fills substantially the full cross sectional area of the interior of the container 11. One side of the spool 18 lies flat against the base 12 and the other lies closely adjacent the lid 14. As shown in FIGS. 2 and 3, the spool 18 forms a hollow ring and in the central region of the ring is located an integrated circuit chip 20 which provides optical circuitry for transmitting light through, and receiving light from, the fibre optic coils 19. The integrated circuit chip 20 in this example comprises a silicon chip providing a plurality of silicon rib waveguides interconnecting a light source with an input to the fibre optic coils 19. It also provides a light transmission path from light output from the coils to a light detector. The integrated circuit chip 20 includes a phase modulation detector to detect phase differences between light which is transmitted around the coils 19 in two opposite directions. It also includes a polariser for polarising the plane of light transmitted around the fibre optic coils. The waveguides include optical couplers so that light passes from the waveguides on the chip 20 into both an inlet and an outlet from the fibre optic coil assembly on the spool 18 so that light is transmitted in two opposite directions around the coil assembly. The phase difference which is detected by the integrated circuit chip 20 for light which has passed around the coil assembly in the two opposite directions is used to give an indication of the speed of rotation of the coil assembly about an axis perpendicular to the plane of the coil assembly. The chip 20 provides, in addition to the light source 21 and detector 22 a plurality of fibre connectors 23 to couple the waveguides 24 to the optical fibres 19. FIG. 1 illustrates schematically at 25 the extension of an optical fibre from the chip 20 to the beginning of the fibre optic loop assembly 19. The fibre 25 is aligned in a V-groove in the chip 20 and extends upwardly over a pedestal support 26 which is secured to the base 12 so as to direct the fibre into the opening of the spool 18. The fibre 25 is secured only in its contact point with the top of the pedestal 26 so as to accommodate thermal changes without stressing the fibre.

To avoid any sharp curves in the optical fibres between the chip 20 and the loops formed on the spool 18, the spool 18 is formed with a wide tunnel passage 30 as indicated in FIG. 3. This tunnel through the inner wall 31 of the spool extends around a substantial arcuate extent so that the fibre 25 forming an inlet to the loop assembly and a similar fibre coming from an exit from the loop assembly have a gentle curvature from the chip onto the first winding around the spool. Diametrically opposite the tunnel 30 is a further tunnel 33 which forms a cutaway portion on the lower face of the spool 18 so as to be aligned with a mating projection in the casing assembly so as to locate and retain the spool 18 in an accurately aligned position within the casing. The tunnel 33 may bridge and locate with an elongated support 37 for the chip 20 secured across the base 12 below the chip 20.

The ceramic base 12 is formed with metal tracking 38 on its upper surface which is connected to terminals 35 on the integrated circuit chip 20 by wire bonding 39. The tracking 38 is connected by electrical connections 36 buried in the ceramic base 12 so that they pass below the junction of the wall 13 of the ceramic base 12 without effecting the hermetic seal between the wall and the base. The buried connectors 36 are then connected outside the wall 13 to the external contact pads 17.

In the above example the ceramic base 12 is formed with an array of gold tracking strips on the upper surface of the electrically insulating ceramic to form the necessary connections within the casing 11. The cylindrical ring 13 is metallic and formed of Kovar which is soldered to a solder ring track 40 formed on the base 12 below the wall 13. An electrically insulating layer is formed below the solder ring 40 between the ceramic base 12 and the solder thereby avoiding electrical interconnection between the buried connections 36 and the solder ring. The electrical contact from the gold tracks on the base 12 is connected through the buried connectors 36 to the exterior of the casing on projection 15.

By use of the above assembly the fibre is incorporated into the packaging without damage and problems are avoided in sealing the exit of optical fibres from the integrated circuit 20 as they are contained within the sealed container 11. Furthermore, the electrical connections to the interior of the assembly are reliably made without destroying the hermetic seal of the package. The chip 20 is mounted on the base 12 and secured in position for example by use of adhesive between the chip support 37 and the base. The terminals on the chip are wire bonded to the respective branches of the tracking 38 which are preformed in the base 12 as a single base unit. The metal ring 13 is positioned around the chip 20 and spool 18 after the fibre connections have been made. The ring 13 is soldered to the solder ring 40 to provide a hermetically sealed annular joint. The metal lid 14 is then soldered to the upper part of the ring 13 to provide a hermetically sealed closed package.

As is shown in FIG. 2, the integrated circuit chip 20 is mounted on the base 12 within the central opening of the ring carrier 18. The end of the chip 20 nearest the tunnel 30 is spaced sufficiently far from the tunnel 30 to avoid sharp angles. The other end of the chip 20 does not extend beyond the outer dimension of the ring 18 so that the size of the container 18 is determined by the size of the fibre carrier on which the optic fibre loops are formed.

It will be seen that by using buried electrical connectors through part of the package walls, it is possible to complete all the electrical connections while the package is open with the lid off. After completing the internal connections, the lid is sealed onto the remainder to seal the package hermetically.

The invention is not limited to the details of the foregoing example. In place of the buried connectors 36, pins may pass through the base 12. A metal base may be used with metal pins passing through the base in insulated mountings, and forming contacts for wire bonding with the chip. In such a case the ring 13 may be formed as a one piece unit with the base 12.

What is claimed is:

1. A sealed fibre optic assembly for a fibre optic gyroscope which assembly comprises a fibre optic support ring carrying at least one loop of optic fibre, a hermetically sealed casing surrounding said support ring and comprising a base plate, a perimeter wall upstanding from the base plate and surrounding said support ring, a cover secured to the perimeter wall so as to close the casing on the side of the support ring remote from the base plate and electrically connecting circuitry comprising external electrical terminals and electrical connectors extending from said terminals through part of the casing in sealed engagement with the casing, to the interior of the casing, and optical circuitry coupled to said loop to direct light in opposite directions around said loop and to receive light from the loop, said optical circuitry comprising a light source, a light detector and phase detecting means, and being mounted on the base plate within said sealed casing, and electrically coupled to said electrical connectors in the interior of the casing, and said base plate comprising electrically insulating material and including buried electrical connectors extending below said perimeter wall interconnecting said optical circuitry with said external electrical terminals.

2. A sealed fibre optic assembly according to claim 1 in which said optical circuitry is located on said base plate within said support ring.

3. A sealed fibre optic assembly according to claim 1 in which said base plate includes a projecting region outside said perimeter wall on which external electrical terminals are provided and connected to said optical circuitry.

4. A sealed fibre optic assembly according to claim 1 in which said optical circuitry includes at least one phase modulator.

5. A sealed fibre optic assembly according to claim 1 in which said optical circuitry includes polarising means for polarising light transmitted around the loop.

6. A sealed fibre optic assembly according to claim 1 in which said optical circuitry comprises an integrated semiconductor optical device.

7. A sealed fibre optic assembly according to claim 1 in which said optical circuitry is integrated on a single planar substrate.

8. A sealed fibre optic assembly according to claim 6 in which said integrated semiconductor optical device includes at least one silicon waveguide.

9. A sealed fibre optic assembly according to claim 8 in which said integrated semiconductor optical device includes a plurality of silicon rib waveguides.

10. A sealed fibre optic assembly according to claim 1 in which said perimeter wall is cylindrical.

11. A sealed fibre optic assembly according to claim 10 in which said cover comprises a circular plate.

12. A sealed fibre optic assembly according to claim 10 in which said base plate comprises a circular portion on which said perimeter wall is secured in sealed contact.

13. A sealed fibre optic assembly according to claim 1 in which the perimeter wall is metallic and the base plate has a solder ring formed over an insulating layer covering the electrical connectors, the solder ring being soldered to an edge of the perimeter wall.

14. A sealed fibre optic assembly according to claim 13 in which the cover is metallic and is soldered to the other end of the perimeter wall.

15. A sealed fibre optic assembly according to claim 1 in which the at least one optic fibre loop is wound on a spool having a cut away portion in part of the spool adjacent the base and the base has a mating projection to engage the cut away portion and hold the spool in a required rotational position relative to the base.

16. A sealed assembly according to claim 1 in which the at least one optic fibre loop is wound on a spool having a cut away portion of sufficient arcuate extent to allow fibres to pass from the outside of the spool through the cut away portion to the optical circuitry without unwanted stress in the fibres.

* * * * *